(12) United States Patent
Yamamoto et al.

(10) Patent No.: US 6,555,244 B1
(45) Date of Patent: Apr. 29, 2003

(54) POLYPROPYLENE SERIES RESIN SHEET

(75) Inventors: Toshiki Yamamoto, Ichihara (JP); Akinori Maekawa, Ichihara (JP); Takanori Nakashima, Ichihara (JP)

(73) Assignees: Chisso Corporation, Osaka (JP); Chisso Petrochemical Corp., Tokyo (JP)

( * ) Notice: Subject to any disclaimer, the term of this patent is extended or adjusted under 35 U.S.C. 154(b) by 0 days.

(21) Appl. No.: 10/236,453

(22) Filed: Sep. 6, 2002

Related U.S. Application Data

(62) Division of application No. 09/863,951, filed on May 23, 2001, now Pat. No. 6,495,632.

(30) Foreign Application Priority Data

Jun. 16, 2000 (JP) ........................................ 2000-181353

(51) Int. Cl.⁷ .......................... B32B 27/00; B32B 27/08
(52) U.S. Cl. ........................ 428/500; 428/515; 428/516; 428/520
(58) Field of Search ................................ 428/500, 515, 428/516, 520

(56) References Cited

U.S. PATENT DOCUMENTS 6,495,632 B2 * 12/2002 Yamamoto et al. ......... 525/191
6,511,755 B1 * 1/2003 Mochizuki et al. ......... 428/516

* cited by examiner

*Primary Examiner*—Nathan M. Nutter
(74) *Attorney, Agent, or Firm*—J. C. Patents

(57) ABSTRACT

This invention relates to a propylene series resin sheet that has a large tan δ and high frequency welding characteristics, excellent transparency, low-temperature impact resistance, and surface durability. The propylene series resin sheet is characterized by a mixture of a polypropylene series composition with a weight percentage of 50–99% and an ethylene series copolymer with a weight percentage of 1–50%.

6 Claims, 1 Drawing Sheet

POLYPROPYLENE SERIES RESIN SHEET

CROSS-REFERENCE TO RELATED APPLICATION

This application is a divisional application of, and claims the priority benefit of, U.S. application Ser. No. 09/863,951 filed on May 23, 2001 and now U.S. Pat. No. 6,495,632.

BACKGROUND OF THE INVENTION

1. Field of Invention

This invention relates to a propylene series resin sheet that has high frequency welding characteristics obtained from a mixture of a specific polypropylene series composition and a specific ethylene series copolymer. More particularly, this invention relates to a propylene series resin sheet that has high frequency welding characteristics, excellent transparency, low-temperature impact resistance, and surface durability.

2. Description of Related Art

Polypropylene sheets are widely used as materials for wrapping and for decoration, because polypropylene sheets have excellent mechanical, optical and thermal properties suitable for wrapping.

As for polypropylene, the propylene-ethylene block copolymers, consisting of propylene homopolymer, propylene-α-olefin di-copolymer or propylene-α-olefin multi-copolymer, propylene homopolymer/propylene-ethylene copolymer, are used. The features of the aforementioned compositions are suitable for the above-mentioned usage.

However, it is difficult to treat the conventional polypropylene sheet with the high frequency welding process, thus limiting its usage. Furthermore, methods for improving the properties of transparency, low-temperature impact resistance and surface durability are in conflict with one another. For example, a polypropylene sheet using propylene homopolymer has inferior low-temperature impact resistance. A polypropylene sheet using a propylene-α-olefin di-copolymer or propylene-α-olefin multi-copolymer has good transparency, but has inferior low-temperature impact resistance and surface durability. On the other hand, a polypropylene sheet using a propylene-ethylene block copolymer, which fails to reach a specific intrinsic viscosity ratio, has excellent low-temperature impact resistance, but has inferior transparency and surface durability, further causing fish-eyed defects.

In the conventional polypropylene sheets, it is impossible to achieve transparency, low-temperature impact resistance and surface durability together with high frequency welding characteristics.

SUMMARY OF THE INVENTION

The invention provides a propylene series resin sheet having transparency, low-temperature impact resistance and surface durability together with high frequency welding characteristics.

In order to achieve the previous purposes, this invention solves the prior art problems and provides a propylene series resin sheet having transparency, low-temperature impact resistance and surface durability together with high frequency welding characteristics.

The polypropylene series composition consists of a crystalline polypropylene component (PP) and propylene-α-olefin copolymer component (RC, with α-olefin other than propylene). The propylene-α-olefin copolymer component (RC) has an intrinsic viscosity $[\eta]_{RC}$ below 6.5 dl/g. The viscosity ratio $[\eta]_{RC}/[\eta]_{PP}$ of the intrinsic viscosity $[\eta]_{RC}$ and the intrinsic viscosity $[\eta]_{PP}$ of the crystalline polypropylene component (PP) is about 0.6~1.2. The weight of the crystalline polypropylene component (PP) is represented as $W_{PP}$, while the weight of the propylene-α-olefin copolymer component (RC) is represented as $W_{RC}$. The multiplying product of the weight ratio $W_{PP}/W_{RC}$ and the viscosity ratio $[\eta]_{RC}/[\eta]_{PP}$ $[([\eta]_{RC}/[\eta]_{PP}) \times (W_{PP}/W_{RC})]$ is in a range between 0.2 to 4.5 for the polypropylene series composition. By using the RC that contains discrete domains distributed along the flowing directions of the PP during molding or distributed randomly but at least connected to another domain, the sheets obtained have excellent transparency, low-temperature impact resistance and surface durability. Furthermore, a specific ethylene series copolymer with a large dielectric loss tangent (tan δ) is mixed into the polypropylene series composition, thus increasing high frequency welding characteristics and obtaining a propylene series resin sheet with excellent transparency, low-temperature impact resistance and surface durability at the same time.

As described above, the present invention provides a sheet that has high frequency welding characteristics, excellent transparency, low-temperature impact resistance, and surface durability. Moreover, the present invention provides a propylene series resin sheet having high frequency welding characteristics and the aforementioned features that is suitable for various applications, for example sheets for stationery and as a construction material used in a porch.

The present invention has the following compositions:

(1) A propylene series resin sheet characterized by a mixture of a polypropylene series composition with a weight percentage of 50–99% and an ethylene series copolymer with a weight percentage of 1–50%. The aforementioned polypropylene series composition consists of a crystalline polypropylene component (PP) and a propylene-α-olefin copolymer component (RC, with any α-olefin other than propylene). The propylene-α-olefin copolymer component (RC) has an intrinsic viscosity $[\eta]_{RC}$ of 6.5 dl/g or less. The viscosity ratio $[\eta]_{RC}/[\eta]_{PP}$ of the intrinsic viscosity $[\eta]_{RC}$ and the intrinsic viscosity $[\eta]_{PP}$ of the PP is about 0.6~1.2. The weight of the PP is represented as $W_{PP}$, while the weight of the RC is represented as $W_{RC}$. The multiplying product of the weight ratio $W_{PP}/W_{RC}$ and the viscosity ratio $[\eta]_{RC}/[\eta]_{PP}$ $[([\eta]_{RC}/[\eta]_{PP}) \times (W_{PP}/W_{RC})]$ is in a range between 0.2 to 4.5 for the polypropylene series composition. The aforementioned ethylene series copolymer has a peak value of a dielectric loss tangent larger than $5.0 \times 10^{-3}$ (100 kHz) under a cohesive energy density of 60–90 cal/cm$^3$.

(2) In the propylene series resin sheet as cited above in (1), the aforementioned polypropylene series composition consists of crystalline polypropylene component (PP) that contains propylene-α-olefin copolymer with a propylene content of 90% more by weight and propylene-α-olefin copolymer component (RC).

(3) The propylene series resin sheet as cited above in (1), the polypropylene series composition consists of a crystalline polypropylene component (PP) and a propylene-α-olefin copolymer component (RC) that contains a propylene-α-olefin copolymer (an α-olefin other than propylene) with an α-olefin content of 10–60% by weight.

(4) In the propylene series resin sheet as cited above in (1), the polypropylene series composition consists of a crystalline polypropylene component (PP) and a propylene-α-olefin copolymer component (RC) that contains a propylene-ethylene copolymer with an ethylene content of 15–60% by weight.

(5) In the propylene series resin sheet as cited above in (1), the ethylene series copolymer includes copolymers of ethylene with unsaturated carboxylic acid, its derivatives or vinyl ester.

(6) In the propylene series resin sheet as cited above in (1), the ethylene series copolymer includes copolymers of ethylene with unsaturated carboxylic acid or its derivatives.

(7) A propylene series resin, multi-layered sheet includes at least a layer of the propylene series resin sheet as cited above in (1) to (6).

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
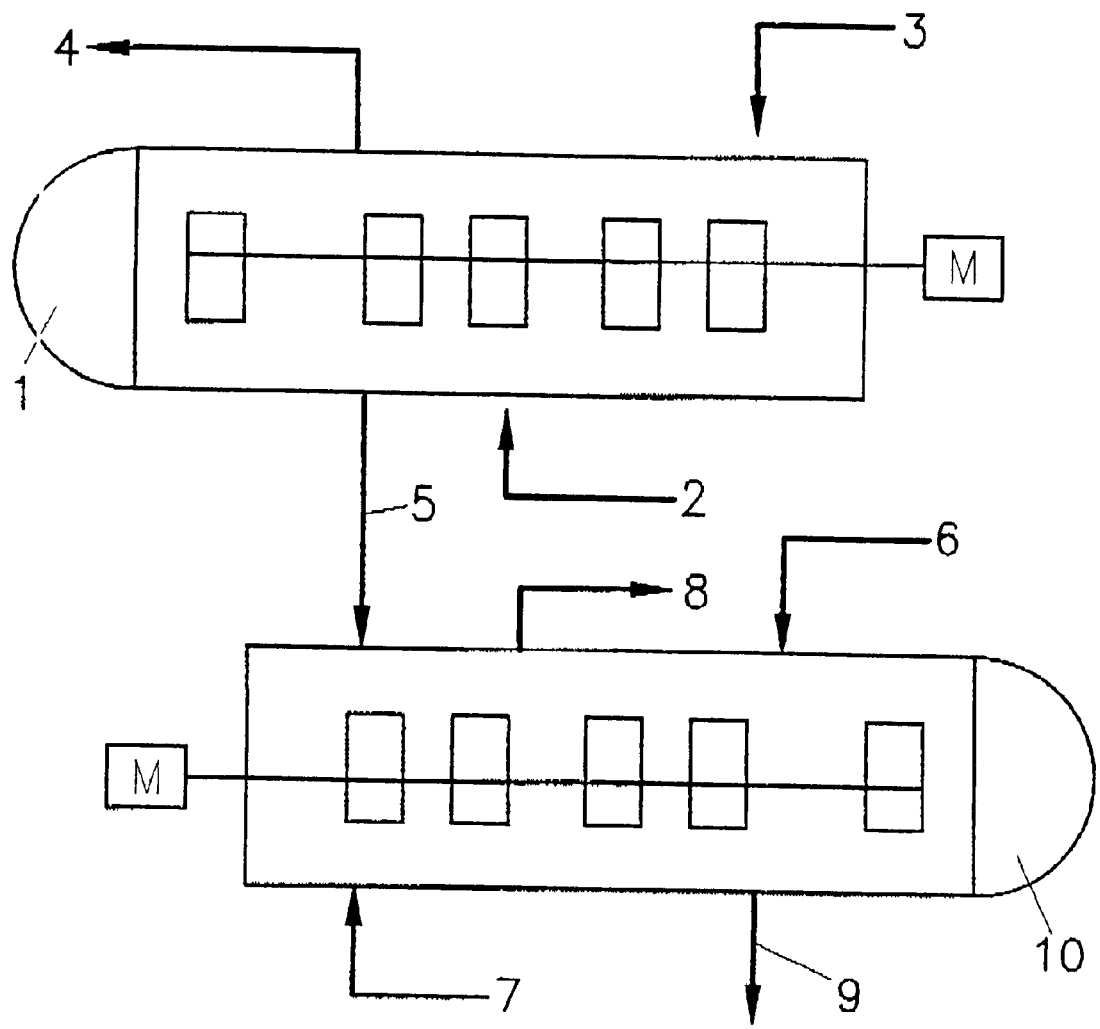
FIG. 1 is the flow process chart of a consecutive polymerization apparatus according to one preferred embodiment of this invention.

In the polypropylene series composition, the crystalline polypropylene component (PP) includes a propylene homopolymer or propylene-α-olefin copolymer with a propylene content of 90–99% by weight. The propylene content in the crystalline polypropylene component (PP) can influence characteristics of transparency, impact resistance, surface durability and high frequency welding for the sheets obtained. With a lower propylene content, the sheet obtained has good transparency, good impact resistance and increased high frequency welding characteristics, but has low surface durability.

For the crystalline polypropylene component (PP) containing a propylene-α-olefin copolymer with a propylene content of 90–99% by weight, the α-olefin polymerized with propylene comprises ethylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, and 3-methyl-1-pentene. Preferably, ethylene is used.

For the propylene-α-olefin copolymer component (RC), the propylene-α-olefin copolymer contains α-olefin other than propylene with a α-olefin content of 10–60% by weight, preferably 20–60% by weight, and most preferably, 30–55% by weight.

The α-olefin content in the propylene-α-olefin copolymer component (RC) can influence characteristics of transparency, impact resistance, surface durability and high frequency welding for the obtained sheets. With a higher propylene content, the sheet obtained has good low-temperature impact resistance and increased high frequency welding characteristics. However, with too much α-olefin, it can influence compatibility between PP and RC, thus reducing transparency and surface durability for the obtained sheet.

For the propylene-α-olefin copolymer component (RC) containing a propylene-α-olefin copolymer, the α-olefin polymerized with propylene comprises ethylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, and 3-methyl-1-pentene. Preferably, ethylene is used.

The propylene-α-olefin copolymer component (RC), measured in tetralin under 135° C., has an intrinsic viscosity $[\eta]_{RC}$ of 6.5 dl/g or less, preferably within the range of 1.7–2.8 dl/g. The viscosity ratio $[\eta]_{RC}/[\eta]_{PP}$ of the intrinsic viscosity $[\eta]_{RC}$ a intrinsic viscosity $[\eta]_{PP}$ of the PP, measured under the same conditions, is about 0.6~1.2, preferably within the range of 0.7–1.0.

Furthermore, the intrinsic viscosity $[\eta]_{RC}$ of RC can influence the process properties for the polypropylene series composition. The viscosity ratio $[\eta]_{RC}/[\eta]_{PP}$ of the intrinsic viscosity $[\eta]_{RC}$ and the intrinsic viscosity $[\eta]_{PP}$ can influence distribution of RC over PP. If the intrinsic viscosity $[\eta]_{RC}$ of RC is too large, it can deteriorate molding for the mixture of the polypropylene series composition and the ethylene series copolymer, further causing problems in production.

On the other hand, if the viscosity ratio $[\eta]_{RC}/[\eta]_{PP}$ is too small, the obtained sheet has inferior low-temperature impact resistance. If the viscosity ratio $[\eta]_{RC}/[\eta]_{PP}$ is too large, the obtained sheet has inferior transparency, surface durability and high frequency welding characteristics. Therefore, without a proper viscosity ratio, it is impossible to achieve all the features.

In the polypropylene series composition, the weight of PP is represented as $W_{PP}$, while the weight of the RC is represented as $W_{RC}$. The multiplying product of the weight ratio $W_{PP}/W_{RC}$ and the viscosity ratio $[\eta]_{RC}/[\eta]_{PP}$ $[([\eta]_{RC}/[\eta]_{PP}) \times (W_{PP}/W_{RC})]$ is in a range between 0.2 to 4.5, preferably within the range of 1.0–3.0.

If the aforementioned multiplying product is too small, the obtained sheet has inferior low-temperature impact resistance. If the aforementioned multiplying product is too large, the obtained sheet has inferior transparency, surface durability and high frequency welding characteristics. Therefore, without a proper multiplying product, it is impossible to achieve all the features.

Regarding the molding for the mixture of the polypropylene series composition and the ethylene series copolymer, and regarding the shape of the obtained sheet, the polypropylene series composition should have a melt flow rate (230° C., load 21.18N, hereinafter abbreviated as MFR) of 0.1–50 g/10 min., preferably 0.2–20 g/10 min.

The ethylene series copolymer has a peak value of a dielectric loss tangent larger than $5.0 \times 10^{-3}$ (100 kHz), preferably $10.0 \times 10^{-3}$ (100 kHz), under a cohesive energy density of 60–90 cal/cm$^3$, preferably 65–85 cal/cm$^3$. If the cohesive energy density is not in the range of 60–90 cal/cm$^3$, the aforementioned polypropylene series composition has inferior compatibility, thus causing inferior transparency for the obtained sheet. If the peak value of the dielectric loss tangent is less than $5.0 \times 10^{-3}$ (100 kHz), it deteriorates the high frequency welding characteristics.

The aforementioned cohesive energy density is obtained from the solubility parameter of Small formula multiplying 2. MFR is obtained from the flow weight in a unit time, using melted extrusion from JIS K 7210 orifice, 230° C., load 21.18 N. The peak value of the dielectric loss tangent is obtained according to J IS K 6911.

The ethylene series copolymer used in the present invention is not limited to those having the previous features of cohesive energy density and dielectric loss tangent, but is chosen from appropriate ones in copolymers of ethylene with unsaturated carboxylic acid, its derivatives or vinyl ester. For example, copolymers of ethylene with unsaturated carboxylic acid, its derivatives or vinyl ester include: ethylene-methyl methacrylate copolymer, ethylene-ethyl acrylate copolymer, ethylene-propyl acrylate copolymer, ethylene-butyl acrylate copolymer, ethylene-methyl methacrylate copolymer, ethylene-ethyl methacrylate copolymer, ethylene-butyl methacrylate copolymer, ethylene-vinyl acetate copolymer, ethylene-vinyl propionate copolymer, ethylene-vinyl butyrate copolymer, ethylene-acrylate copolymer, ethylene-methyl methacrylate copolymer, ethylene-maleic acid copolymer, ethylene-fumaric acid copolymer, ethylene-crotonic acid copolymer, ethylene-sorbic acid copolymer, ethylene-mesaconic acid copolymer, ethylene-acrylamide copolymer, and ethylene-acrylonitrile copolymer. The previous copolymers can be mixed with various ratios.

Regarding the molding for the mixture of the polypropylene series composition and the ethylene series copolymer, and regarding the shape of the obtained sheet, the ethylene series copolymer should have a melt flow rate (230° C., load 21.18N, hereinafter abbreviated as MFR) of 0.1–50 g/10 min, preferably 0.2–20 g/10 min.

For the mixture of the polypropylene series composition and the ethylene series copolymer, the polypropylene series composition has a weight percentage of 50–99%, preferably 52–70%, while the ethylene series copolymer has a weight percentage of 1–50%, preferably 30–48%. The mixing ratio of the polypropylene series composition and the ethylene series copolymer can greatly influence the transparency, low-temperature impact resistance, surface durability and high frequency welding characteristics. If the weight percentage of the ethylene series copolymer is less than 1%, it will have unsatisfactory high frequency welding characteristics. If the weight percentage of ethylene series copolymer is more than 50%, it will have inferior surface durability, even though its transparency and low-temperature impact resistance are enhanced.

The mixture of the polypropylene series composition and the ethylene series copolymer used in the present invention can obtain the above features and is suitable for fabricating sheets with superior transparency, low-temperature impact resistance, surface durability and high frequency welding characteristics.

More specifically, polypropylene series composition can be obtained from fabricating PP and RC respectively, and then mixing these two components in mixing apparatuses, or the polypropylene series composition can be obtained from fabricating PP first and then polymerizing propylene with σ-olefin to form RC in the presence of PP.

One of these two methods is described hereinafter in detail as an example.

At the first stage, the crystalline polypropylene component (PP) is fabricated in the vapor phase in the presence of a solid regular catalyst consisting of: a solid catalyst ingredient containing titanium (A), an organic aluminum compound (B) and an organic silicon compound (C). At the second stage, propylene with an σ-olefin other than propylene is continuously fabricated to form RC, thus obtaining a polypropylene series composition.

The solid catalyst ingredient containing titanium (A) uses inorganic carriers, such as a magnesium compound, silica compound and alumina, and organic carriers, such as polystyrene, as the carriers for the titanium compounds. The carriers are well-known electron donors, such as ethers or esters.

For example, spraying can be used for the magnesium compound in the alcohol solution to solidify the magnesium compound with alcohol additives. The solidified component is dried up partially and then treated with titanium halide and the electron donor, thus forming the solid catalyst ingredient containing titanium (Japanese Patent No. JP3-119003A). Also, the magnesium compound can dissolve in a tetrahydrafuran/alcohol/electron donor solution to form a magnesium carrier coupled with TiCl4 alone or with TiCl4 and an electron donor. Further treatment with titanium halide and an electron donor can form the solid catalyst ingredient containing titanium (Japanese Patent No. JP4-103604A).

The solid catalyst ingredient containing titanium (A) has an average grain of 25–300 microns, preferably 30–150 microns. If the average grain of the solid catalyst ingredient containing titanium (A) is below 25 microns, the powder of the polypropylene series composite has low fluidity, thus attaching to walls of the polymerization chamber or blender. This may cause contamination or cause problems in the delivery of the powder.

Moreover, the solid catalyst ingredient containing titanium (A) has a uniformity below 2.0. If the uniformity is more than 2.0, the powder of the polypropylene series composite has inferior fluidity, thus causing problems in the delivery of the powder.

The organic aluminum compound can be expressed as $R_m^1AlX_{3-m}$, in which $R^1$ is a hydrocarbon group or alkoxyl group with carbon numbers 1–20, X is halide and m is any positive number, as long as $3 \geq m \geq 1$.

For example, the organic aluminum compound includes trimethyl aluminum, triethyl aluminum, tri-n-propyl aluminum, tri-n-butyl aluminum, tri-i-butyl aluminum, dimethyl aluminum chloride, diethyl aluminum chloride, [di-(methyl aluminum)] trichloride, di-n-propyl aluminum chloride, [di-(ethyl aluminum)] trichloride, ethyl aluminum dichloride, diethyl aluminum iodide, and ethoxy diethyl aluminum. Preferably, triethyl aluminum is used.

The aforementioned organic aluminum compound can be any one out of the previous group or a mixture of two or more compounds.

The organic silicon compound can be expressed as $R_X^2R_Y^3Si(OR^4)_Z$, in which $R^2$ and $R^4$ are alkyl, and $R^3$ is a hydrocarbon group or hydrocarbon group with heteroatom, wherein $2 \geq X \geq 0$, $3 \geq Y \geq 1$, $3 \geq Z \geq 1$, and $X+Y+Z=4$.

For example, the organic silicon compound comprises methyl trimethoxysilane, ethyl trimethoxysilane, n-butyl trimethoxysilane, phenylmethyl dimethoxysilane, t-butyl trimethoxysilane, t-butyl triethoxysilane, phenyl triethoxysilane, methyl ethyl dimethoxysilane, methyl phenyl diethoxysilane, dimethyl dimethoxysilane, dimethyl triethoxysilane, diisopropyl dimethoxysilane, diisobutyl dimethoxysilane, 2-t-butyl dimethoxysilane, diphenyl dimethoxysilane, trimethyl methoxysilane, cyclohexyl methyl dimethoxysilane, and trimethyl ethoxysilane.

Preferably, diisopropyl dimethoxysilane, diisobutyl dimethoxysilane, 2-t-butyl dimethoxysilane, diphenyl dimethoxysilane, and cyclohexyl methyl dimethoxysilane can be used.

The aforementioned organic silicon compound can be any one out of the previous group or a mixture of two or more compounds.

At the first stage, the crystalline polypropylene component (PP) is fabricated in the presence of a solid regular catalyst, consisting of: a solid catalyst ingredient containing titanium (A), an organic aluminum compound (B) and a corresponding organic silicon compound (C). The solid catalyst ingredient containing titanium (A), which is carrying a precursor polymer reacted from a little α-olefin, is treated with a pre-activation process. The pre-activation process includes using a solid catalyst ingredient containing titanium (A), an organic aluminum compound (B') and a corresponding organic silicon compound (C').

In the pre-activation process, the ratio of the solid catalyst ingredient containing titanium (A) and organic aluminum compound (B') is not limited. In general, one mole of titanium atoms in a solid catalyst ingredient containing titanium (A) reacts with organic aluminum compound (B') within a molecular range of 0.1–40 moles, preferably 0.3–20 moles. Under 10–80° C. for 10 minutes to 48 hours, one gram of solid catalyst ingredient containing titanium (A) can react with 0.1–100 grams of α-olefin, preferably 0.5–50 grams.

In the pre-activation process, one mole of organic aluminum compound (B') reacts with 0.01–10 moles of corresponding organic silicon compound (C'), preferably 0.05–5 moles of (C'). The selection range of organic aluminum compound (B') is the same as that of organic aluminum compound (B). However, organic aluminum compound (B') can be the same as, or different from organic aluminum compound (B). Preferably, organic aluminum compound (B') is triethyl aluminum.

The selection range of organic silicon compound (C') is the same as that of organic silicon compound (C). However, organic silicon compound (C') can be the same as, or different from organic silicon compound (C). Preferably, organic silicon compound (C') can be diisopropyl dimethoxysilane, diisobutyl dimethoxysilane, 2-t-butyl dimethoxysilane, diphenyl dimethoxysilane, and cyclohexyl methyl dimethoxysilane.

In the pre-activation process, the α-olefin reacted with the solid catalyst ingredient containing titanium (A) can be, for example, ethylene, 1-butene, 1-pentene, 1-hexene, 1-octene, 1-decene, 1-dodecene, 1-tetradecene, 1-hexadecene, 1-octadecene, 1-eicosene, 4-methyl-1-pentene, and 3-methyl-1-pentene. Preferably, ethylene is used.

The α-olefin can be one out of the previous group or a mixture of two or more compounds. The molecular weight of the pre-activated polymer can be adjusted by hydrogen-containing molecules.

In the pre-activation process of the solid catalyst ingredient containing titanium (A), the inert solvents include saturated hydrocarbon fluids, such as, hexane, heptane, octane, decane, dodecane and fluid paraffine, or solvents inert to polymerization, like silicon oil containing dimethyl polysiloyane. These inert solvents can be one of the aforementioned solvents used alone or mixed with two or more solvents. After removing impurities, like sulfur compounds, from the solvents, the inert solvents are used, thus avoiding water from deteriorate polymerization.

At the first stage, the crystalline polypropylene component (PP) is fabricated in the vapor phase in the presence of the solid catalyst ingredient containing titanium (A). At the second stage, propylene with an σ-olefin other than propylene is continuously fabricated to form RC. The vapor phase polymerization method in the first stage is limited to a slurry polymerization method or a massive polymerization method. The vapor phase polymerization method is better used in the second stage, preferably using the same method as used in the first stage. If the vapor phase polymerization method used in the second stage is different, RC might come out from the solvent, interfering with the stability of the process.

Even though the polymerization conditions of the crystalline polypropylene component (PP) are different depending on the polymerization form, in the vapor phase polymerization method, a determined amount of polypropylene powder dispersant is added into the polymerization chamber, in the presence of a pre-activated solid regular catalyst, and the PP is formed from propylene with a corresponding α-olefin other than propylene, under 20–120° C. (preferably 40–100° C.) and a polymerization pressure of 1.0 atm. to 9.9 MPa (preferably 0.59–5.0 MPa). The pre-activated solid regular catalyst consists of a solid catalyst ingredient containing titanium (A), an organic aluminum compound (B) and a corresponding organic silicon compound (C).

In the solid regular catalyst, the Al/Ti ratio of the solid catalyst ingredient containing titanium (A) and the organic aluminum compound (B) is around 1–500 molar ratio, preferably 10–300 molar ratio, using atoms per gram (atom/g) as comparison units.

The B/C ratio of the organic aluminum compound (B) and the organic silicon compound (C) is about 1–10 molar ratio, preferably 1.5–8 molar ratio. If the B/C ratio is too large, crystallinity of PP is reduced, thus decreasing the rigidity of mold products from the polypropylene series composition. If the B/C ratio is too small, polymerization activity is lowered, thus reducing productivity.

For adjusting the molecular weight of PP, hydrogen-containing molecules can be used as a molecular weight adjuster, so that intrinsic viscosity of PP can fulfill the requirements of the present invention. After PP is obtained, a portion is taken to test for intrinsic viscosity, flow rate, and catalyst amount in each unit weight.

After PP fabrication at the first stage under 20–120° C. (preferably 40–100° C.) and a polymerization pressure of 1.0 atm. to 9.9 MPa (preferably 0.59–5.0 MPa), propylene with an α-olefin other than propylene are polymerized to form RC at the second stage.

The copolymer component (RC) has an α-olefin (an α-olefin other than propylene) content controlled by the molar ratio of α-olefin and propylene in the gases, and the α-olefin (an α-olefin other than propylene) content in RC is adjusted to 10–60% by weight.

If PP and RC are continuously fabricated to form polypropylene series composition, it is impossible to measure intrinsic viscosity $[\eta]_{RC}$ of RC. Therefore, intrinsic viscosity $[\eta]_{PP}$ of PP and intrinsic viscosity $[\eta]_{whole}$ of the whole polypropylene series composition are measured in order to calculate the intrinsic viscosity $[\eta]_{RC}$ of RC from the following formula (1):

$$[\eta]_{RC} = \{[\eta]_{whole} - (1 - W_{RC}/100)[\eta]_{PP}\}/(W_{RC}/100) \quad (1)$$

On the other hand, the weight ($W_{RC}$) of RC can be adjusted by polymerization time or by a polymerization activity adjuster, like catalysts such as carbon oxide or hydrogen sulfide, so that the weight ($W_{RC}$) of RC in the polypropylene series composition is about 10–50% weight percentage. Furthermore, for adjusting the molecular weight of PP, hydrogen-containing molecules can be used as a molecular weight adjuster, so that intrinsic viscosity of PP can fulfill requirements of the polypropylene series composition used in the present invention. The method for supplying hydrogen is compatible with conditions of the polypropylene series composition used in the present invention.

The polymerization method can be the un-consecutive type, the half-consecutive type or the consecutive type. Preferably, the consecutive type is used.

After the second stage, the reactant monomers are removed from the polymerization system to obtain powder polymers. The obtained polymers can be used to test for intrinsic viscosity, α-olefin (an α-olefin other than propylene) content, and catalyst amount in each unit weight.

For the polypropylene series composition in the present invention, polyolefin can be combined with various well-known additives, such as oxidation inhibitors, neutralizers, light-stabilizers, UV absorbers, inorganic fillers, anti-blocking agents, lubricants, anti-static agents, metal de-activators and transparency nucleating agents.

The oxidation inhibitors are, for example, phenolic antioxidant, phosphorous antioxidant, or thio antioxidant. The neutralizers are, for example, fatty acid salts of calcium stearate or zinc stearate. The light-stabilizers and UV absorbers are, for example, hindered amine, nickle complex compound, benzotriazole or benzophenone. The inorganic fillers and anti-blocking agents are, for example, calcium carbonate, silica, hydrotalcite, zeolite, aluminum silicate, or magnesium silicate. The lubricants are amide fatty acids, for example stearate amide. The anti-static agents are partially esterified fatty acids, for example glycerin fatty acid monoester. The metal de-activators are, for example, triazine, phosphonic, epoxy, triazole, hydrazide, or oxamide. The transparency nucleating agents are, for example, sorbitols, such as alkyl substituted benzylidene sorbitol, rosin or petroleum resin.

The method for adding the aforementioned additives into the polypropylene series composition is, for example, to mix using a high-speed blender, such as a Henschel mixer (Brand name), together with conventional mixers, such as a spiral mixer or tumbler mixer etc. Furthermore, a conventional single-axis or double-axis extrusion apparatus can be used for melting and kneading to form pellets.

The method for mixing the polypropylene series composition and the ethylene series copolymer is, for example, to mix using a high-speed blender, such as a Henschel mixer (Brand name), together with a spiral mixer or tumbler mixer etc. Furthermore, a conventional single-axis or double-axis extrusion apparatus can be used for melting and kneading to form pellets.

For obtaining the propylene series resin sheet that has high frequency welding characteristics, excellent transparency, low-temperature impact resistance, and surface durability, the conventional fabricating methods, for example the extrusion molding method, compression molding method, and casting molding method, can be used. The preferable conventional method is the extrusion molding method with superior productivity. More particularly, the method applying a T die sheet molding apparatus is preferred. The T die sheet molding apparatus includes a three-layered sheet extrusion stepper, feed block, T-die, cool roller, guide roller, receiving roller, anneal roller, trimming cutter, masking, scaling cutter, and stacker etc. The obtained propylene series resin sheet has a thickness of about 0.05–2.0 mm, preferably 0.06–0.3 mm.

The multi-layered sheet described hereinafter are oriented (one-axis oriented or two-axis oriented) or un-oriented sheets, including at least a layer of a mixture of the polypropylene series component and ethylene series component. The layered structure of the multi-layered sheet can be two layered with a thermoplastic resin/resin mixture of polypropylene series component and ethylene series component. The layered structure also can be three-layered with a resin mixture of polypropylene series component and ethylene series component/ thermoplastic resin/ thermoplastic resin, or a resin mixture of polypropylene series component and ethylene series component/thermoplastic resin/resin mixture of polypropylene series component and ethylene series component.

The three-layered multi-layered sheet with a resin mixture of polypropylene series component and ethylene series component/thermoplastic resin/resin mixture of polypropylene series component and ethylene series component structure has superior high frequency welding characteristics and surface durability.

The thermoplastic resin can be selected from the following group, including: high density and low density polyethylene, linear low density polyethylene, super low density polyethylene, a polypropylene other than the polypropylene series component of the present invention, polyolefin (e.g., 4-methyl-1-pentene), olefin elastomerics (e.g., ethylene-propylene elastomerics, or ethylene-butene elastomerics) or nylon, poly ethylene terephthalate, polyvinylacetate, polyvinyl alcohol, and styrene elastomerics (e.g., styrene-butadiene-styrene block copolymer). MFR of the thermoplastic resin (under 230° C., load 21.18N) is better within the range of 0.1–50 g/10 min, preferably 0.2–20 g/10 min.

For enhancing the adherence between the resin mixture of the polypropylene series component and the ethylene series component layer and the thermoplastic resin layer, a layer of modified olefin resin layer (e.g., a polypropylene chloride layer) can be disposed in-between.

The propylene series resin sheet obtained in the present invention may be treated with surface treatments, including a corona discharge treatment, baking treatment or plasma treatment, for printing, painting, or metal attachment purposes.

Hereinafter the preferred embodiments and comparisons are described for detailed explanation; however, the scope of the present invention is not limited by these examples.

The following descriptions illustrate the physical properties and measuring methods for of the polypropylene series component.

The following polypropylene series component contains crystalline polypropylene composition (PP) and propylene-α-olefin copolymer component (RC) using ethylene or butene as α-olefin.

(a) Intrinsic viscosity (unit: dl/g): measured with solvents and tetrahydronaphthalene under 135° C., using automatic viscosity measurer (AVS2, Mitsui Touatsu Chemical Co.).

(b) Grain of solid catalyst ingredient containing titanium (A) (unit: micron) and uniformity: measured by the standardized sifter (from Malvern Company), using grain distribution to calculate the average grain alue, that is, averaging the grain values from 10% to 60% sieved grains.

(c) Ethylene content (unit: % wt): measured by infrared ray (IR).

(d) 1-butene content (unit: % wt): measured by infrared ray (IR).

(e) Polymer product weight based on each weight unit of the catalyst: measured by high frequency induction coupled with plasma luminescence analysis to obtain Mg amount in the sample, and then further calculated.

(1) Fabrication of the Solid Catalyst Ingredient Containing Titanium (a) Ingredients of the Solid Catalyst Ingredient Containing Titanium:

Dehydrated $MgCl_2$ 95.3 g and dry EtOH 352 ml are mixed in a nitrogen displaced SUS autoclave, stirred and heated under 105° C. After one hour under 105° C., pressurized nitrogen (1.1 MPa) is flown through two spray nozzles at a flow rate of 38l/min. Liquid nitrogen is introduced into spray tower for cooling to keep the temperature at about −15° C. The product collected from the bottom of the tower is collected in cool hexane and then concentrated, with an obtained weight of 256 g. From the chemical composition analysis, the carrier product has a composition of MgCl2.6EtOH.

After sieving the carrier product, globular carriers with grain sizes of 45–212 microns are obtained. The grain carriers are dried under nitrogen for 181 hours with a nitrogen flow rate of 3l/min, while the obtained dry carrier has a composition of MgCl2.1.7EtOH.

The dry carriers (108 g), titanium tetrachloride (1440 ml) and refined 1,2-dichloroethane (2160 ml) are added and mixed into the SUS autoclave (10 L) with a shuttlecock shaped stirrer. After stirring and heating to 100° C., diisobutyl phthalate (61.2 ml) is added, and then heated up under 100° C. for two hours. Afterwards, the mixture is decanted to remove the liquid phase of the mixture. Next, titanium tetrachloride (1440 ml) and refined 1,2-dichloroethane (2880 ml) are added and heated under 100° C. for an hour. The mixture is decanted again to remove the liquid phase. After washing with refined hexane, the product is dried, thus obtaining a solid catalyst ingredient containing titanium (I). The average grain of the solid catalyst ingredient containing titanium (I) is 115 microns, with Mg 19.5% wt, Ti 1.6% wt, Cl 59.0% wt, and diisobutyl phthalate 4.5% wt.

(2) The Pre-activation Process of the Solid Catalyst Ingredient Containing Titanium (I)

The 15 L autoclave with tilted shuttlecock shaped stirrer is displaced with nitrogen, having a stoke of 7.3 centi-Stokes under 40° C. Under room temperature, 4.0 L of saturated hydrocarbon solvent (From CRYSTOL-52 Esso Oil Company), 4.0 L of n-hexane, 52.5 mmol of triethyl aluminum, and 8.0 mmol of diisopropyl dimethoxysilane are added to 70 g of the aforementioned solid catalyst ingredient containing titanium (I). Then, they are heated to 40° C. and reacted under a propylene partial pressure of 0.05 MPa for 5 hours. The analysis shows that each gram of solid catalyst ingredient containing titanium (I) has three grams of propylene.

(3) The First Polymerization Stage

As shown in FIG. 1, the aforementioned pre-activated solid catalyst ingredient containing titanium (I) is provided continuously at a rate of 0.5 g/hr, along with triethyl aluminum as an organic aluminum compound (II) and diisopropyl dimethoxysilane as an organic silicon compound (III), to the transversal polymerization chamber I with the shuttlecock shaped stirrer (L/D=6, content 100 L) under 70° C., a reaction pressure of 2.5 MPa and a stirring rate of 40 rpm. Fluid propylene is provided from a propylene raw material conduit 3, while ethylene gas is provided continuously from a circulating conduit 2. Furthermore, the circulating conduit 2 can provide hydrogen to adjust the molecular weight of the crystalline polypropylene component (PP), further adjusting the hydrogen gas concentration in the chamber to control the intrinsic viscosity of the polymer.

Reaction heat resulting from evaporation heat of fluid propylene raw material provided by the tube 3 is removed. Unreacted gas expelled from the reaction polymerization chamber passes through the unreacted gas conduit 4 to outside of the chamber system. The unreacted gas is condensed and concentrated, and circulated back to the polymerization chamber. For the crystalline polypropylene component (PP) formed in the chamber, as long as the polymer formed reaches 50% volume of the whole reaction volume, the polymer pulling conduit 5 delivers products continuously from the polymerization chamber 1 to the polymerization chamber in the second polymerization stage. At the same time, a portion of PP is taken out from the polymer pulling conduit 5 as test samples for measuring intrinsic viscosity and polymer product weight per weight unit of the catalyst.

(4) The Second Polymerization Stage

The aforementioned PP formed in the first polymerization stage, fluid propylene from the propylene raw material conduit 6, and ethylene gas or ethylene/butene mixed gas from the activity inhibitor leading conduit 7 are provided continuously to the horizontal polymerization chamber 10 with the shuttlecock shaped stirrer (L/D=6, content 100 L) under 60° C., a reaction pressure of 2.1 MPa, and a stirring rate of 40 rpm. As a result, ethylene with propylene/ethylene or ethylene/propylene with 1-butene are co-polymerized. The ethylene content and the 1-butene content in RC can be adjusted by adjusting the ethylene/propylene molar ratio or ethylene/propylene/1-butene molar ratio in the vapor phase. Moreover, the co-polymerization degree of RC can be controlled by an activity inhibitor and carbon oxide provided from the activity inhibitor eading conduit 7, while the molecular weight of the copolymer RC can be controlled by hydrogen.

Reaction heat resulting from evaporation heat of fluid propylene raw material provided by the tube 6 is removed. Unreacted gas expelled from the reaction polymerization chamber passes through the unreacted gas conduit 8 to outside of the chamber system. The unreacted gas is condensed and concentrated, and circulated back to the polymerization chamber. For the crystalline polypropylene component (PP) formed in the chamber, as long as the polypropylene series component formed reaches 50% volume of the whole reaction volume, the polymer pulling conduit 9 delivers products continuously from the polymerization chamber 10.

The productivity of the polypropylene series component is around 8–12 Kg/hr.

After removing the unreacted monomer from the polypropylene series component, a portion of the polypropylene series component is taken out as test samples for measuring intrinsic viscosity, ethylene content, 1-butene content by IR, and polymer product weight per weight unit of catalyst.

A stoichiometric composition of 99.75% wt polypropylene series component, 0.05 % wt tetrakis [methylene(3,5-di-t-butyl-4-hydroxyphenyl)propionate] methane, 0.1% wt tris(2,4-di-t-butyl phenol)phosphite, and 0.1% wt calcium stearate are mixed by a Henschel mixer (Brand name) and are extruded by a single-axis extrusion apparatus (caliber 65 mmφ), becoming pellets after melting and kneading, as shown in Table I.

These grainy composition samples hereinafter are referred to as A1 to A6.

TABLE I

|  | A-1 | A-2 | A-3 | A-4 | A-5 | A-6 |
|---|---|---|---|---|---|---|
| Crystalline polypropylene (PP) | | | | | | |
| Intrinsic viscosity $[\eta]_{PP}$ [dl/g] | 1.8 | 1.8 | 1.8 | 1.4 | 2.0 | 1.8 |
| Propylene content [Wt %] | 97 | 97 | 97 | 97 | 97 | 97 |
| Copolymer (RC) | | | | | | |
| Intrinsic viscosity $[\eta]_{RC}$ [dl/g] | 1.8 | 1.8 | 1.8 | 2.8 | 0.8 | 1.8 |
| Ethylene content [Wt %] | 36 | 36 | 25 | 36 | 25 | 36 |
| 1-butene content [Wt %] | — | — | — | — | — | 8 |
| (Whole composition) | | | | | | |
| $[\eta]_{RC}/[\eta]_{PP}$ [−] | 1.0 | 1.0 | 1.0 | 2.0 | 0.4 | 1.0 |
| $W_{PP}/W_{RC}$ [−] | 1.0 | 2.0 | 2.0 | 2.0 | 2.0 | 1.0 |
| $([\eta]_{RC}/[\eta]_{PP}) \times (W_{PP}/W_{RC})$ [−] | 1.0 | 2.0 | 2.0 | 4.0 | 0.8 | 1.0 |
| $MFR_{WHOLE}$ [g/10 min −] | 5.9 | 6.0 | 6.1 | 6.3 | 5.7 | 6.0 |
| Dielectric loss tangent (100 kHz) [× $10^{-3}$] | 1.5 | 1.3 | 1.2 | 0.4 | 1.1 | 1.5 |

The grainy ethylene series component samples cited in the following Table II are explained as follows:

B-1: Cohesive energy density of 84.2 cal/cm$^3$, dielectric loss tangent of 45.1×10$^{-3}$(100 kMz),ethylene-methyl methacrylate copolymer (from Acryft WM403, methyl methacrylate (MMA) content of 38% wt, Sumitomo Chemical Company) with MFR of 15 g/10 min.

B-2: Cohesive energy density of 74.5 cal/cm$^3$, dielectric loss tangent of 4.3×10$^{-3}$(100 kMz),ethylene-methyl methacrylate copolymer (from Acryft WD203-1, methyl methacrylate (MMA) content of 5% wt, Sumitomo Chemical Company) with MFR of 2 g/10 min.

TABLE II

| | Ethylene series component | |
|---|---|---|
| | B-1 | B-2 |
| Cohesive energy density [cal/cm3] | 84.2 | 74.5 |
| Dielectric loss tangent (100 kHz) [× $10^{-3}$] | 45.1 | 4.3 |
| MFR [g/10 min] | 15 | 2 |

The following descriptions explain the evaluation methods for the sheets.

Dielectric loss tangent (tan δ): tangent of the sheet is obtained by a mutual dielectric bridge method based on JIS K 6911 as a standard. If tan δ is large, dielectric heating can be performed easily in a high frequency electrical field, thus showing superior high frequency welding characteristics.

Transparency (unit %): a transparency standard measurement of measuring Hazes in the sheet based on ASTM D1003. The smaller the value is, the better transparency is.

Low-temperature impact resistance (unit ° C.): After the sheet stays in the constant temperature chamber for 15 min., impact resistance of the sheet is measured based on ASTM D 781. The temperature at which impact resistance is lower than 0.5[J] is measured, assuming the sheet is undergoing fragile destruction. The lower the temperature is, the better the impact resistance is.

Surface durability: surface durability is measured by using a pencil scratch examination on the sheet based on JIS K5400. The hardness of the pencil lead can be used to express durability. The harder the pencil lead is, the better the surface durability is.

High frequency welding characteristics (peeling strength unit g/cm): Both ends of the sheet are processed by high frequency welding under 40.16 MHz and are measured by an Instron type testing machine to test peeling strength as an index for high frequency welding characteristics. The larger the peeling strength is, the better the high frequency welding characteristics are.

The embodiments (E)1–7 and Comparison examples (C)1–4 are shown below.

Each pellet of A1–A6 shown in Table I and B1–B2 shown in Table II is mixed with each other under ratios shown in Table III and Table IV for 20 min. in the tumbler mixer.

A T-die extrusion apparatus (caliber 65 mmφ) is used to melt the aforementioned compounds under 230° C. The compounds are extruded and spread by air-knife, and then cooled on a cooler with a surface temperature of 50° C. so that a single-layered sheet with a thickness of 0.2 mm is obtained. The propylene series resin sheet obtained is evaluated, and the results are shown in Table III and Table IV below.

TABLE III

| | (E)1 | (E)2 | (E)3 | (E)4 | (E)5 | (E)6 | (E)7 |
|---|---|---|---|---|---|---|---|
| A-1 [Wt %] | 55 | 80 | | | | | |
| A-2 [Wt %] | | | 55 | 80 | | | |
| A-3 [Wt %] | | | | | 55 | 80 | |
| A-6 [Wt %] | | | | | | | 55 |
| B-1 [Wt %] | 45 | 20 | 45 | 20 | 45 | 20 | 45 |
| Tan δ [× $10^{-3}$] | 22.8 | 15.5 | 20.8 | 15.3 | 21.0 | 14.9 | 23.6 |
| HAZE [%] | 3.5 | 4.3 | 3.2 | 4.0 | 2.9 | 3.7 | 2.7 |
| Impact resistance [° C.] | −40 | −35 | −40 | −35 | −40 | −30 | −40 |
| Hardness of pencil [−] | 4B | 3B | 4B | 3B | 3B | 3B | 4B |
| Peeling strength [g/cm] | 2230 | 1850 | 2220 | 1890 | 2130 | 1800 | 2290 |

TABLE IV

| | (C)1 | (C)2 | (C)3 | (C)4 |
|---|---|---|---|---|
| A-1 [Wt %] | 55 | | | |
| A-4 [Wt %] | | 55 | 55 | |
| A-5 [Wt %] | | | | 55 |
| B-1 [Wt %] | | 45 | | 45 |
| B-2 [Wt %] | 45 | | 45 | |
| Tan δ [× $10^{-3}$] | 3.2 | 11.5 | 2.0 | 18.2 |
| HAZE [%] | 3.5 | 5.3 | 5.8 | 4.5 |
| Impact resistance [° C.] | −30 | −30 | −30 | −25 |
| Hardness of pencil [−] | 5B | 6B | 5B | 5B |
| Peeling strength [g/cm] | 420 | 1020 | 400 | 1810 |

From the above tables, the embodiments have larger peeling strength, compared to the comparison examples, representing the index of high frequency welding characteristics, as well as greater hardness of the pencil relating to surface durability. Moreover, the embodiments have lower Hazes for better transparency and better low temperature impact resistance.

Therefore, the propylene series resin sheets obtained by using a mixture of a specific polypropylene series component and a specific ethylene series component has high frequency welding characteristics, surface durability, transparency and low-temperature impact resistance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A propylene series resin, multi-layered sheet, including at least a layer of a propylene series resin sheet characterized by a mixture of a polypropylene series composition with a weight percentage of 50–99% and an ethylene series copolymer with a weight percentage of 1–50%, wherein the polypropylene series composition comprises a crystalline polypropylene component (PP) and a propylene-α-olefin copolymer component (RC, with any α-olefin other than propylene), the propylene-α-olefin copolymer component (RC) having an intrinsic viscosity $[\eta]_{RC}$ of 6.5 dl/g or less, with a viscosity ratio $[\eta]_{RC}/[\eta]_{PP}$ of the intrinsic viscosity $[\eta]_{RC}$ and an intrinsic viscosity $[\eta]_{PP}$ of the PP being about 0.6~1.2, a weight of the PP represented as $W_{PP}$, a weight of the RC represented as $W_{RC}$, a multiplying product of a weight ratio $W_{PP}/W_{RC}$ and the viscosity ratio $[\eta]_{RC}/[\eta]_{PP}$ $[([\eta]_{RC}/[\eta]_{PP}) \times (W_{PP}/W_{RC})]$ being in a range between 0.2 to 4.5 for the polypropylene series composition, and wherein the ethylene series copolymer has a peak value of a dielectric loss tangent larger than $5.0 \times 10^{-3}$ (100 kHz) under a cohesive energy density of 60–90 cal/cm$^3$.

2. The multi-layered sheet as claimed in claim 1, wherein the polypropylene series composition comprises a crystalline polypropylene component (PP) that contains a propylene-α-olefin copolymer with a propylene content of 90% or more by weight and a propylene-α-olefin copolymer component (RC).

3. The multi-layered sheet as claimed in claim 1, wherein the polypropylene series composition comprises a crystalline polypropylene component (PP) and a propylene-α-olefin copolymer component (RC) that contains a propylene-α-olefin copolymer (any α-olefin other than propylene) with a α-olefin content of 10–60% by weight.

4. The multi-layered sheet as claimed in claim 1, wherein the polypropylene series composition comprises a crystalline polypropylene component (PP) and a propylene-α-olefin copolymer component (RC) that contains a propylene-ethylene copolymer with an ethylene content of 15–60% by weight.

5. The multi-layered sheet as claimed in claim 1, wherein the ethylene series copolymer includes copolymers of ethylene with unsaturated carboxylic acid, its derivatives or vinyl ester.

6. The multi-layered sheet as claimed in claim 1, wherein the ethylene series copolymer includes copolymers of ethylene with unsaturated carboxylic acid or its derivatives.

* * * * *